April 22, 1952 — F. BOLTON, SR — 2,593,721
FEEDER FOR HAY BALING MACHINES
Filed March 26, 1948 — 2 SHEETS—SHEET 2

INVENTOR
Felix Bolton, Sr.
BY
ATTORNEYS

Patented Apr. 22, 1952

2,593,721

UNITED STATES PATENT OFFICE 2,593,721

FEEDER FOR HAY BALING MACHINES

Felix Bolton, Sr., Chowchilla, Calif., assignor of one-half to Claud Clayton, Chowchilla, Calif.

Application March 26, 1948, Serial No. 17,247

1 Claim. (Cl. 100—25)

This invention is directed to, and it is an object to provide, an auxiliary feeder for a hay baling machine of the pick-up, side delivery type wherein the cut hay is picked up, upon advance of the implement, from a field windrow and thence fed to the baling chamber from one side thereof.

In this type of hay baling machine the pick-up mechanism projects laterally from one side of the main body of the baling machine and includes a pick-up reel unit which feeds the hay to a horizontal transverse platform. In turn, the hay is fed from such platform into the baling chamber from one side of the main body; there being a primary feeder, such as a rotary drum, working above the platform adjacent said body and the baling chamber. However, difficulty is experienced in feeding the hay along the platform to the passage between the rotary drum and said platform, necessitating manual assistance as with a pitch fork.

It is therefore an additional object of the invention to provide an auxiliary feeder, for a hay baling machine as above, which comprises a fork mounted for oscillatory motion in a vertical transverse plane above the platform laterally out from the rotary drum; said fork, on its down stroke, describing an arcuate path leading in a direction downward and inward toward the drum so as to effectively feed the hay along the platform in a laterally inward direction to the aforesaid passage.

Another object of the invention is to drive the auxiliary feed fork from the main crank shaft of the baling machine so as to accomplish a positive action of said fork and proper timing of its stroke with respect to the baling machine plunger; there being a novel drive assembly connected between said crank shaft and the fork.

A further object of the invention is to provide a practical and reliable auxiliary feeder for hay baling machines, and one which will be exceedingly effective for the purpose for which it is designed.

These objects are accomplished by means of such structure and relative arrangement of parts as will fully appear by a perusal of the following specification and claim.

Figure 1:
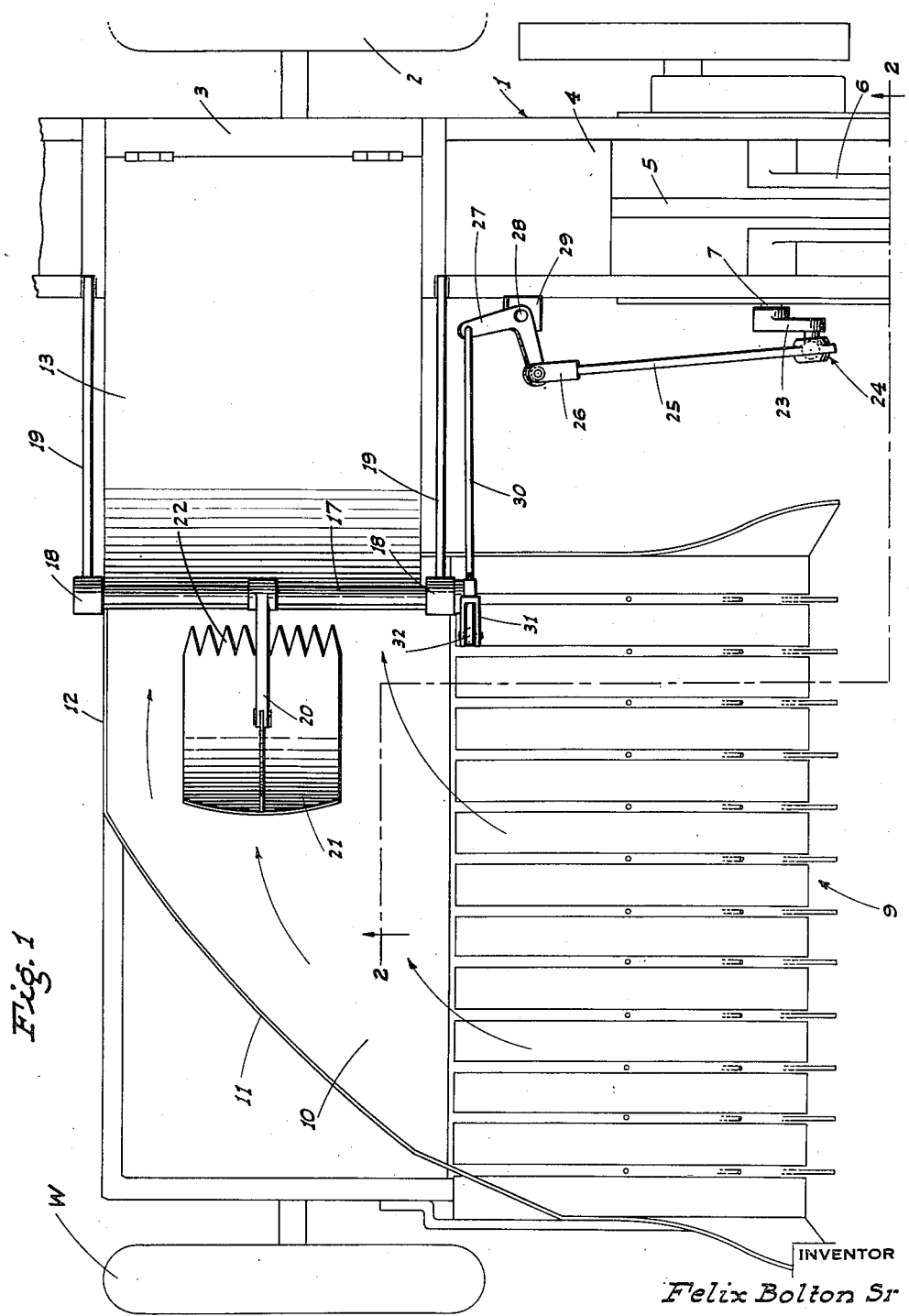
Fig. 1 is a plan view of the auxiliary feeder as applied to a pick-up type hay baling machine.

Referring now more particularly to the characters of reference on the drawings, the invention is embodied in connection with a pick-up type hay baling machine which includes a longitudinally extending main body 1 supported for movement along the ground by wheels, one of which is indicated at 2. As is generally conventional, the main body 1 includes a baling chamber 3 in which a plunger 4 is mounted for reciprocating motion.

The plunger 4 is reciprocated in the baling chamber 3 by means of a connecting rod 5 whose other end is secured to the main crank 6 of a power actuated crank shaft 7.

The pick-up mechanism of the hay baling machine includes a laterally projecting frame attached at one end to the main body 1 in alinement with the baling chamber 3; such laterally projecting frame 8 being supported, at its outer end, by a wheel W.

At its leading edge the laterally projecting frame 8 carries a hay pick-up reel unit, indicated generally at 9; said pick-up reel unit being arranged, upon advance of the implement, to feed hay from a field windrow onto a horizontal transverse platform 10 mounted atop the frame 8; such platform extending inwardly to a point where it delivers into the baling chamber 3.

An upstanding, rearwardly and inwardly converging deflector plate 11 extends across the platform 10 from its outer end and merges with an upstanding back wall 12, so that hay fed onto said platform in a longitudinal direction is diverted for feeding in a transverse inward direction.

Figure 2:
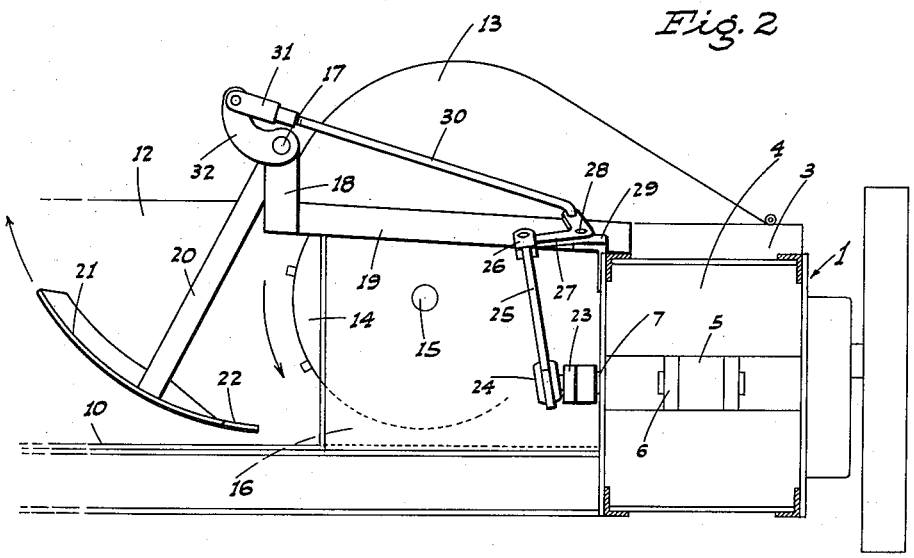
Fig. 2 is a fragmentary transverse sectional elevation, substantially on line 2—2 of Fig. 1, showing the auxiliary feeder in use and with the pick up device omitted; the oscillating fork being shown at the end of its down stroke.

The inner end portion of the platform 10 is enclosed, sides and top, by suitable means, including a hood 13, and a rotary drum 14 is disposed above said inner end portion of the platform 10 to provide a primary feeder. The drum 14 is carried on a cross shaft 15 suitably journaled in the structure, and the lower portion of said drum clears the platform 10 to form a hay feed passage 16. The rotary drum 14 is transversely cleated, and is driven in the direction shown by the arrow in Fig. 2, whereby hay from the outer portion of the platform is intended to be fed by said drum through the passage 16 into the baling chamber 3 for compression and baling.

However, in hay baling machines of the type above described difficulty is experienced in maintaining an effective flow of the hay from the exposed portion of the platform 10 into the passage 16 for advance by the rotary drum 14.

To overcome this difficulty the present invention contemplates the embodiment, in the hay baling machine, of the following oscillatory auxiliary feeder:

A horizontal cross shaft 17 is disposed above the platform 10 laterally outwardly of the main portion of the rotary drum 14; said cross shaft being journaled in connection with upstanding end brackets 18 caried on rigid beams 19 which extend outwardly from the main body 1.

Centrally of its ends the cross shaft 17 is fitted with a fixed radial arm 20 of substantial length, which projects outward to connection with an arcuate fork 21 whose lower edge is toothed, as at 22.

Figure 3:
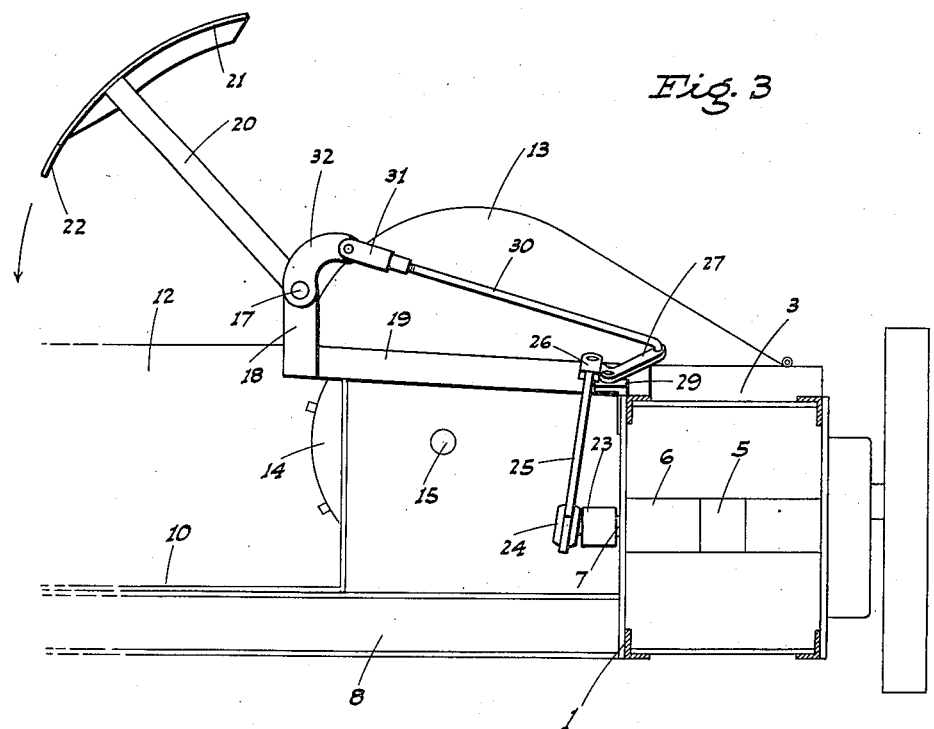
Fig. 3 is a similar view, but shows the oscillating fork at the top of its up-stroke.

The arrangement of parts is such that with predetermined oscillating movement of the cross shaft 17, the fork oscillates through an arcuate path which extends from an outward elevated point, as in Fig. 3, downwardly and inwardly to a lower inward point directly in front of the hay feed passage 16. It will thus be seen that as such arcuate fork 21 traverses its oscillatory path, hay which piles up on the platform 10 outwardly of the drum 14 is recurringly and effectively forked or fed from such platform to the drum 14 and into the passage 16. The action of the arcuate fork 21 thus wholly eliminates the difficulty of hay piling up on the platform outwardly of the drum 14 and not properly feeding to the latter.

It is desirable that the arcuate fork 21 reciprocate in predetermined timed relation to the plunger 4, i. e. the fork 21 should be in its down position when the plunger 4 is retracted, and in its raised position when said plunger is advanced.

To accomplish this end there is provided a novel drive assembly between the main crank shaft 7 and the cross shaft 17 of the auxiliary feeder; such assembly comprising:

On the end adjacent the pick-up reel unit 9 the main crank shaft 7 is fitted with a relatively small external crank 23, whose crank pin is coupled by a ball and socket unit 24 with one end of a rod 25. The rod 25 leads rearwardly to pivotal connection, by means of a clevis 26, with the outer end of one leg of a bellcrank lever 27 pivoted, as at 28, at its elbow to a bracket 29 on the main body 1.

The other leg of the bellcrank lever 27 extends rearwardly, and at its outer end is pivotally connected to another rod 30 which leads laterally outward to pivotal connection, by means of a clevis 31, with a generally radial actuating lever 32 on the adjacent end of the cross shaft 17. With the above drive assembly, the rotary motion of the main crank shaft 7 is converted into oscillatory motion of the cross shaft 17 and the arcuate feeder fork 21, while at the same time maintaining the desired timing between said fork and the plunger 4.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a hay baling machine which includes a baling chamber open on one side, a reciprocating plunger therein, operating means for the plunger including a crankshaft extending transversely of the chamber, a feed platform extending laterally from said open side of the chamber, and a feed drum disposed to feed material laterally from the platform into the chamber; an auxiliary hay feed attachment comprising a fork extending lengthwise of the drum and having a top arm adapted to project laterally of the machine in the direction of the chamber, a shaft journaled on the machine above and parallel to the axis of the drum and on which the arm is fixed, and means to oscillate said shaft and fork through a stroke of predetermined length and in predetermined timed relation to the operation of the plunger, said means comprising a radial lever on the shaft at the end thereof nearest the crankshaft, a relatively short-stroke crank secured on the end of the crankshaft which extends on the same side as said platform, a vertical-axis bellcrank mounted on the machine intermediate said short crank and the radial lever, a rod extending between and having swivel connection with one leg of the bellcrank and said short crank, and another rod extending between and having swivel connection with the other leg of the bellcrank and said radial lever.

FELIX BOLTON, Sr.

REFERENCES CITED

The following references are of record in the file of this patent:

UNITED STATES PATENTS

| Number | Name | Date |
| --- | --- | --- |
| Re. 12,865 | Wehrenberg | Oct. 13, 1908 |
| 1,571,437 | Ruth | Feb. 2 1926 |
| 1,756,988 | Nichols | May 6, 1930 |
| 1,827,024 | Risby | Oct. 13, 1931 |
| 1,857,373 | Goggins | May 10, 1932 |
| 2,294,440 | Barker | Sept. 1, 1942 |
| 2,362,861 | Russell | Nov. 14, 1944 |